US012633975B2

(12) United States Patent
Ortega

(10) Patent No.: US 12,633,975 B2
(45) Date of Patent: May 19, 2026

(54) METHOD AND SYSTEM FOR PERFORMING MULTIPLE-USER MULTIPLE-INPUT MULTIPLE-OUTPUT COMMUNICATION, AND NON-TRANSITORY COMPUTER READABLE STORAGE MEDIUM

(71) Applicant: SAMSUNG ELETRÔNICA DA AMAZÔNIA LTDA., Manaus (BR)

(72) Inventor: Alvaro Javier Ortega, Manaus (BR)

(73) Assignee: SAMSUNG ELETRÔNICA DA AMAZÔNIA LTDA., Manaus (BR)

( * ) Notice: Subject to any disclaimer, the term of this patent is extended or adjusted under 35 U.S.C. 154(b) by 432 days.

(21) Appl. No.: 18/196,528

(22) Filed: May 12, 2023

(65) Prior Publication Data

US 2024/0171232 A1    May 23, 2024

(30) Foreign Application Priority Data

Nov. 4, 2022    (BR) ...................... 10 2022 022466 8

(51) Int. Cl.
*H04B 7/0456* (2017.01)
*H04B 1/04* (2006.01)
*H04B 7/0452* (2017.01)

(52) U.S. Cl.
CPC ......... *H04B 7/0473* (2013.01); *H04B 1/0475* (2013.01); *H04B 7/0452* (2013.01)

(58) Field of Classification Search
None
See application file for complete search history.

(56) References Cited

U.S. PATENT DOCUMENTS

| | | | |
|---|---|---|---|
| 9,647,735 | B2 | 5/2017 | Sajadieh et al. |
| 9,712,296 | B2 | 7/2017 | Noh et al. |
| 10,014,918 | B2 | 7/2018 | Capar et al. |

(Continued)

OTHER PUBLICATIONS

Jung-Chieh Chen, "Constructive Interference-Based Symbol-Level Precoding Design for Millimeter-Wave Massive Multiuser MIMO Systems With Hardware-Efficient Hybrid Precoding Architecture" IEEE Access; vol. 9; pp. 18393-18401; Jan. 26, 2021.

(Continued)

*Primary Examiner* — Adnan Baig
(74) *Attorney, Agent, or Firm* — STAAS & HALSEY LLP

(57)    ABSTRACT

A method for performing multiple user multiple input multiple output (MU-MIMO) communication, comprising: computing a digital beamformer matrix with a digital precoder for processing baseband signals; processing the baseband signals with a plurality of radiofrequency (RF) chains; computing an analog beamformer matrix with an analog precoder for processing analog or passband signals. The analog precoder comprises: a plurality of adders connectable to the plurality of antennas; a plurality of three-way switches connectable to the plurality of RF chains and the plurality of adders. One of the three terminals of the three-way switches is directly connected to a RF chain, the other terminal is connected to an inverter, and the last one turns off the signal. Computing an optimization function to obtain a maximization of the system sum-rate with basis on the digital and analog beamforming matrixes, the analog precoder sets a position of the three-way switches.

10 Claims, 9 Drawing Sheets
(6 of 9 Drawing Sheet(s) Filed in Color)

(56) References Cited

U.S. PATENT DOCUMENTS

| | | | |
|---|---|---|---|
| 2020/0136691 A1* | 4/2020 | Li | H04L 27/2644 |
| 2021/0250938 A1* | 8/2021 | Dai | H04W 16/28 |
| 2022/0038150 A1* | 2/2022 | Wu | H04B 7/086 |
| 2024/0079773 A1* | 3/2024 | Geng | H01Q 1/246 |
| 2024/0129005 A1* | 4/2024 | Li | H04B 7/0608 |
| 2024/0372585 A1* | 11/2024 | Abramov | H04B 7/0617 |

OTHER PUBLICATIONS

Alvaro Javier Ortega, Hierarchical optimization: A hybrid processing for downlink massive MU-MIMO mmWave systems *IET Communications*, 15(20), pp. 2526-2536; Sep. 12, 2021.

Yiqi Lu et al., "Improved hybrid precoding scheme for mmWave large-scale MIMO systems", IEEE Access, vol. 7, pp. 12027-12034; Jan. 7, 2019.

Jing Jiang, "Multi-user precoding for dynamic subarrays in mmWave massive MIMO systems", IEEE Access, vol. 7, pp. 101718-101728; Jul. 19, 2019.

* cited by examiner

METHOD AND SYSTEM FOR PERFORMING MULTIPLE-USER MULTIPLE-INPUT MULTIPLE-OUTPUT COMMUNICATION, AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2022 022466 8, filed on Nov. 4, 2022, in the Brazilian Intellectual Property Office, the disclosure of which is incorporated by reference herein in its entirety.

FIELD OF THE DISCLOSURE

The present invention refers to the telecommunication technology field. More specifically, it describes the proposed method and apparatus for implementing massive MIMO (multiple-input, multiple-output) in next wireless communication devices.

DESCRIPTION OF RELATED ART

The last decade has witnessed exponential growth in data traffic and the rapid proliferation of wireless devices. This flood of mobile traffic has significantly exacerbated spectrum congestion in current frequency bands and stimulated intensive interest in exploiting new spectrum bands for wireless communications. Millimeter-wave (mmWave) wireless communications, operating in the frequency bands from 30 to 300 GHz, have been demonstrated as a promising candidate for solving the spectrum congestion problem. The unlicensed 60 GHz band, for example, offers 7 GHz of spectrum spanning 57 to 64 GHz in the United States.

There are two important features of the small wavelength of the mmWave frequencies. On the one hand, the small wavelength makes the mmWave communication sensitive to the channel conditions because almost everything can be considered an obstruction; even the rain, atmospheric gases, water vapor, and atmospheric absorption can produce severe link quality degradation. On the other hand, a large antenna arrays can occupy a very small, e.g., in a rectangular space of 10 cm in length and 5 cm in width, it could be hundreds of antenna elements. Therefore, hundreds or even thousands of antenna elements could be used in future smartphones, and in the base station, this number could be even larger. In addition, research in terahertz wireless communications is ongoing, where the wavelength size is given in micrometers, so in these scenarios, the number of antennas can be absurdly huge.

To take advantage of the large number of antennas and to produce the large array gain, it is necessary to have a signal processing procedure that be able to address the transmitting power to a given area. This signal processing procedure is known as a precoding or channel precoding, which also mitigates the undesired effects cause by the channel conditions. Furthermore, when the wireless communications scenario has multiple users, e.g., wireless communications mobile networks, this precoding procedure can reduce both the undesired channel effects and the inter-user interference.

For multiple-input multiple-output (MIMO) systems operating in conventional cellular frequency bands, the precoding procedure is wholly realized in the digital domain by adjusting both the magnitude and phase of the baseband signals. However, this approach requires a dedicated expensive, and energy-intensive radiofrequency (RF) chain per antenna, where an RF chain includes a low-noise amplifier, a down-converter, a digital to analog converter (DAC), an analog to digital converter (ADC), and so on, which is impractical when the number of antennas is large. As stated before, hundreds of antenna elements are expected, so hundreds of RF chains are required. Therefore, the number of RF chains cannot have the same trend as the number of antennas. For this reason, massive MIMO systems have not been broadly implemented so far, and in the current MIMO systems, even for the base station, the number of antennas is low.

Hybrid alternatives have been considered a promising technology to provide a compromise between hardware complexity and system performance by reducing the number of RF chains. In these hybrid precoding architectures, some expensive and hungry power consumption RF chains are substituted by low-cost and high-energy efficient analog components. Unfortunately, the analog hardware limitations degrade the system's performance because the freedom degrees for the part of the signal processing that is carried out by these analog components are also constrained.

Hybrid precoding procedure is divided into an analog processing, which is also known as analog beamformer, analog precoder, or beamforming, and a digital processing, which is known as digital beamformer or baseband beamformer. As stated before, the reduction of the number of RF chains produces some constraints on the freedom degrees of the signal processing; consequently, the expected performance of hybrid precoding techniques is inferior compared to impractical fully digital precoding techniques. However, hybrid precoding techniques make massive MIMO a technology viable for the next generation of wireless devices, providing an outstanding throughput demanded by the current and future video streaming apps and other services.

Since the great motivation of exploring massive MIMO with less RF chains, academia and industry have focused on hybrid precoding alternatives for the last years. Therefore, many hybrid precoder designs have been proposed aiming to increase the energy efficiency of the equipment. However, in most existing conventional hybrid precoding architectures, a large number of high-resolution analog phase shifters (PSs) are required, which leads to high power consumption and increases the manufacturing cost. Therefore, more energy-efficient hardware architectures for hybrid precoding are required, and novel signal processing techniques that exploit such architectures are indispensable.

Due to the signal processing is designed according to the hardware of the communication devices, conventional signal processing techniques are inadequate for the next wireless communications generation due to different hardware architectures are indispensable. Therefore, novel signal processing techniques are required such that massive MIMO communication using feasible hardware is reliable and energy efficient.

Sajadieh, Masoud, et al. "Hybrid digital and analog beamforming for large antenna arrays." U.S. Pat. No. 9,647,735, 9 May 2017. The authors describe a hardware architecture for hybrid beamforming based on phase shifters (PSs). This fact differs from the present invention because we consider three-way switches and inverters (3SI) rather than PSs. In addition, the authors consider single-user MIMO (SU-MIMO) systems, while the present invention refers to MU-MIMO systems.

Capar, Cagatay, et al. "Systems and methods for beam selection for hybrid beamforming." U.S. Pat. No. 10,014, 918. 3 Jul. 2018. The authors propose a beamforming selection method. In this type of solution, a beamforming set is stored in the memory of the device. Then, the beamforming selection algorithm searches for the more appropriate beam from the fixed beamforming set for each transmission. In contrast, the present invention performs adaptative signal processing techniques, i.e., the transmitted beams are computed periodically according to the channel variation. Therefore, no beamforming' sets or beam selection algorithms are necessary.

Jeehwan, N. O. H., Taeyoung Kim, and Chungyong Lee. "Hybrid zero-forcing beamforming method and apparatus." U.S. Pat. No. 9,712,296. 18 Jul. 2017. This document discloses a hardware architecture for hybrid beamforming based on PSs. This fact differs from the present invention because we consider 3SI rather than PSs. Since the architecture of the present invention and this patent differ greatly from each other, their methods or signals processing are very different as well.

Y. Lu, C. Cheng, J. Yang, and G. Gui, *"Improved hybrid precoding scheme for mmWave large-scale MIMO systems"*, IEEE Access, vol. 7, pp. 12027-12034, 2019. This paper describes a hybrid precoder architecture, where two-way switches and inverters are used rather than PSs. However, the connection of these elements greatly differs from the connection of the present invention. The authors consider a hybrid precoder with fixed partially connected architectures, which means that each RF chain is connected to a fixed antennas' subarray. In contrast, the present invention uses a fully connected architecture, where each RF chain is connected to all antennas through three-way switches and inverters. Furthermore, note that the switch types of the present invention and this paper are different as well.

J. Jiang, Y. Yuan, and L. Zhen, *"Multi-user hybrid precoding for dynamic subarrays in mmWave massive MIMO systems"*, IEEE Access, vol 7, pp. 101718-101728, 2019. In this paper, a dynamic architecture for hybrid processing is proposed. The authors consider that each antenna is switchable among the RF chains. In contrast, the present invention does not have this feature. In addition, the authors consider hybrid precoding architectures based on PSs, which differ from such presented in this invention, which considers 3SI.

Chen, J. C. (2021). Constructive Interference-Based Symbol-Level Precoding Design for Millimeter-Wave Massive Multiuser MIMO Systems With Hardware-Efficient Hybrid Precoding Architecture. *IEEE Access,* 9, 18393-18401. This paper considers the same hybrid precoder architecture used in the present invention. However, our proposed method or signal processing is greatly different. Chen, J. C. proposed a poor method for the switching procedure, which tries to minimize the Euclidian distance between his proposed hybrid precoder and a PS-based hybrid precoder used as reference. However, the PS-based hybrid precoder used by Chen has serious conceptual problems, the main one relies on the fact that the real part of the signal projection expected in the receiver can be negative, so the region characterization for the convex problem definition is wrong. The numerical results presented by Chen are extremely poor. However, these results should be even worse due to the incorrectly defined convex optimization problem. Likely Chen omitted some crucial details of his proposal in this paper. However, even if Chen clarifies his proposal in this paper, his presented results will continue being poor. In contrast, the present invention proposes a proper method for the switching procedure that does not use any of the ideas of Chen.

The prior art comprises solutions capable of enabling wireless communications to use a large number of antennas and a low number of RF chains. However, as stated before, many of the published works consider expensive and low-energy efficient analog components, whereas others propose methods whose signal processing renders poor performance.

SUMMARY OF THE INVENTION

The present invention aims at solving the aforementioned limitations and difficulties related to implementing massive MIMO in wireless mobile communication networks.

The present invention proposes a method for performing multiple-user multiple-input multiple-output (MU-MIMO) communication, comprising:

computing a digital beamformer matrix with a digital precoder for processing baseband signals to be transmitted;

processing the signals with a plurality of RF chains;

computing an analog beamformer matrix with an analog precoder for processing the analog or passband signals, wherein the analog precoder comprises:

a plurality of adders connected to the plurality of antennas, wherein each antenna of the plurality of antennas is connected to an adder of the plurality of adders;

a plurality of three-way switches is connected to the plurality of radiofrequency chains and each three-way switch is connected to the plurality of adders, wherein the first terminal of the three-way switches is directedly connected to the respective RF chain, the second terminal of the three-way switches is connected to an inverter for inverting the phase of the signal, and the third terminal of the three-way switches turns off the signal; and the three-way switches are set based on the computed analog beamforming matrix; and computing an optimization function to obtain a maximization of the system sum-rate with basis on the digital and analog beamforming matrixes, wherein the analog precoder sets the position of the three-way switches with the basis on the maximized sum-rate.

The present invention is also related to a system and the non-transitory computer-readable storage medium adapted to perform the proposed method for MU-MIMO communication.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures listed below help to the explanation of the present invention.

DETAILED DESCRIPTION OF THE INVENTION

Figure 1:
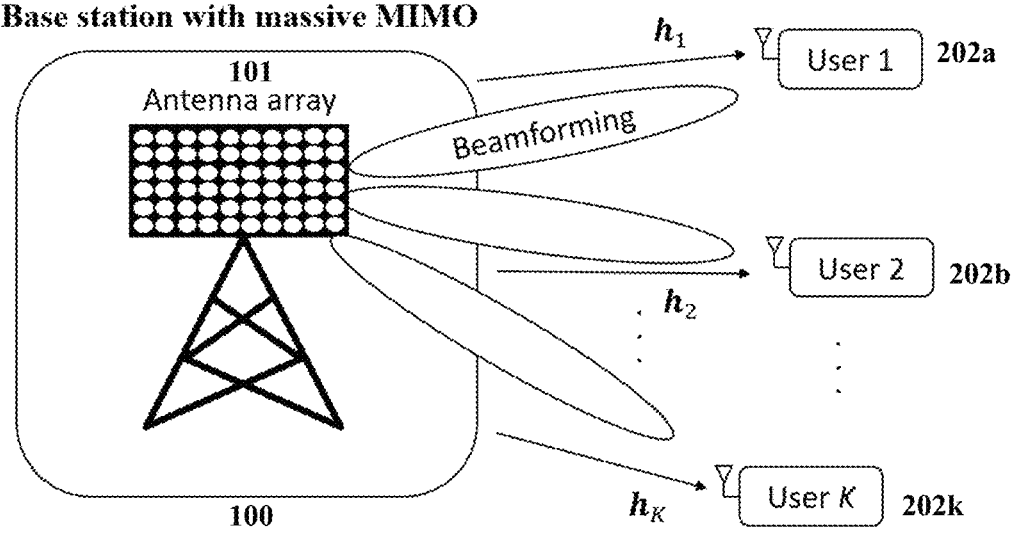
FIG. 1 shows an illustrative system model example for the application of the present invention, where a base station is equipped with massive MIMO and transmits to multiple single-antenna users simultaneously.

The present invention refers to a signal processing method for a hybrid precoder architecture based on three-way switches and inverters, which has the capacity to be used in the transmitters in massive MU-MIMO wireless systems. The main feature of the proposed method relies on the manner to set the optimal values of the three-way switches of the considered hybrid precoder architecture. Numerical results evidence that the proposed method overcomes other considered solutions, suggesting that the present invention results in cheaper and more energy-efficient wireless communication devices.

The present invention refers to a method for MU-MIMO communication, comprising the signal processing applied to the considered hybrid precoder architecture. The advantages of the considered hybrid precoder architecture are that it provides low manufacturing cost and low power consumption for the wireless devices thanks to some of the RF chains are substituted by analog components. The main analog components are signal adders, inverters, and three-way switches. Due to this hardware architecture is based on switches, it is necessary to have a switching procedure that exploits the capacities of this apparatus. The method of the present invention details a switching process that obtain a reliable and high energy-efficient communication.

According to embodiments of the proposed invention, the hybrid precoder architecture considers a fully connected architecture, where each RF chain is connected to all antennas using 3SI instead of PS. The three-way switches give three options for the passband signals: to invert the phase, to not invert the phase, and to turn off the signal. Since there are three options, the considered hardware has more freedom degrees than one-bit PS-based hybrid precoders but less than two-bits PS-based hybrid precoders. Even though, the numerical results evidence that the present invention reaches better performance than the considered three-bits PS-based hybrid precoder.

Proper selection of the switches' value positions is important for the optimal performance of the proposed architecture. Therefore, an algorithm for the switching procedure is proposed, which increases the system sum-rate by optimizing the values settings of the three-way switches in each transmission. Exhaustive numerical results, annexed to the present document, evidence the proposed invention not only reaches higher sum-rate values and lower BER values but is also more energy-efficient than other considered solutions.

Embodiments of the present invention are described in detail. The proposed and existing precoding adaptive techniques are all performed with the help of downlink channel state information (CSI). The assumption that full CSI is available at the transmission side is valid in time-division duplex (TDD) systems because the uplink and downlink share the same frequency band. For frequency-division duplex (FDD) systems, however, the CSI needs to be estimated at the receiver and fed back to the transmitter. The present invention considers that the knowledge of the channel side information has been reached by one of the many channel estimation methods proposed in the literature, e.g., making use of periodical transmissions of pilot symbols or reference signals, as it will be clear for a person skilled in the art. Once the base station knows the user channels, the proposed hybrid precoder is performed. The main advantage of the present invention relies on the capacity for transmitting with high energy efficiency at the cost of slight computation complexity. Furthermore, since the present invention decreases the hardware requirements for signal processing, the manufacturing cost for its practical implementation is reduced as well.

System Model

FIG. 1 presents the considered downlink MU-MIMO systems model. There are K single-antenna users 202a-202k connected to the base station 100. The base station 100 has an antenna array 101 comprising $N_t$ antennas, which sends K data streams simultaneously using $N_{RF}$ RF chains, where $N_{RF}$ satisfies $K \leq N_{RF} \leq N_t$. Observe that in the base station 100, the number of RF chains is less than the number of antennas in the antenna array 101, therefore, the base station 100 performs a hybrid precoder. In addition, it is observed that the base station 100 produces multiple beamforming. Note that each beamforming is addressed to the user placement, this fact highlights that spatial division multiple access (SDMA) is applied by the present invention. In addition, the single-antenna users 202a-202k are merely illustrative, because they can also represent a particular area, where multiple users or devices can be served by convening other access techniques, e.g., orthogonal frequency division multiple access (OFDMA), time division multiple access (TDMA), etc. However, for the sake of simplicity, the present invention will be described considering the single-antenna users as they are throughout this document. Furthermore, this model considers that the users have just one antenna. However, this consideration is also illustrative because the users can have also multiple antennas and use one beamforming, whose model can be reduced as the considered system model.

Previous Hybrid Precoding Architectures

In order to highlight the advantages and functioning of the present invention, firstly the previous techniques will be discussed.

Figure 2:
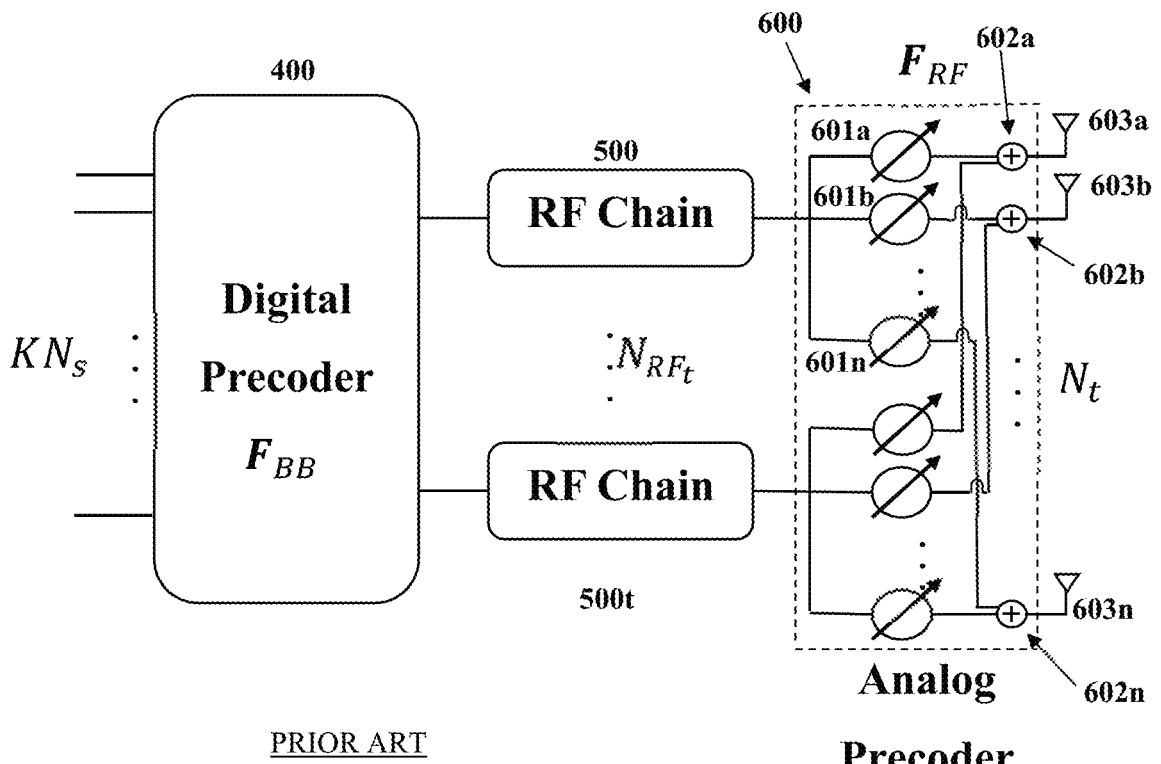
FIG. 2 shows a hybrid precoder that uses a conventional, fully connected architecture based on PSs.

A hybrid precoder using a traditional fully connected architecture based on PS is illustrated in FIG. 2. As it can be seen, the system comprises a digital precoder 400, a plurality of RF chains 500-500t, and an analog precoder 600. When this kind of architectures is used, the analog part 600 of the hybrid precoder, which is represented by matrix $$F_{RF} \in \mathbb{C}^{N_t \times N_{RF_t}},$$

is full. In this fully connected architecture, each RF chain 500-500t is connected to all antennas 603a-603n using PSs 601a-601n and signal adders 602a-602n, so that $N_t N_{RF}$ PSs and $N_t$ signal adders are required. Conventional hybrid precoders with fully connected architectures use PSs with infinite resolution. However, high-resolution PSs are expensive and hungry power consumption. Unfortunately, when these conventional techniques are evaluated using PSs with one to three bits resolution, their performance is significative degraded. Therefore, the problem of state of the art related to hybrid precoding is to find a manner to optimize the balance between hardware complexity and performance. On the one hand, there is a great motivation to reduce the hardware requirements for massive MIMO devices. It will decrease the manufacturing cost and power consumption of wireless devices and turn massive MIMO into feasible wireless communication technology, providing outstanding data speed transmissions. On the other hand, the digital hardware substitution by analog components implies a performance reduction because the hardware constraints also limit the freedom degrees for signal processing.

Proposed Hybrid Precoding Apparatus

Figure 3:
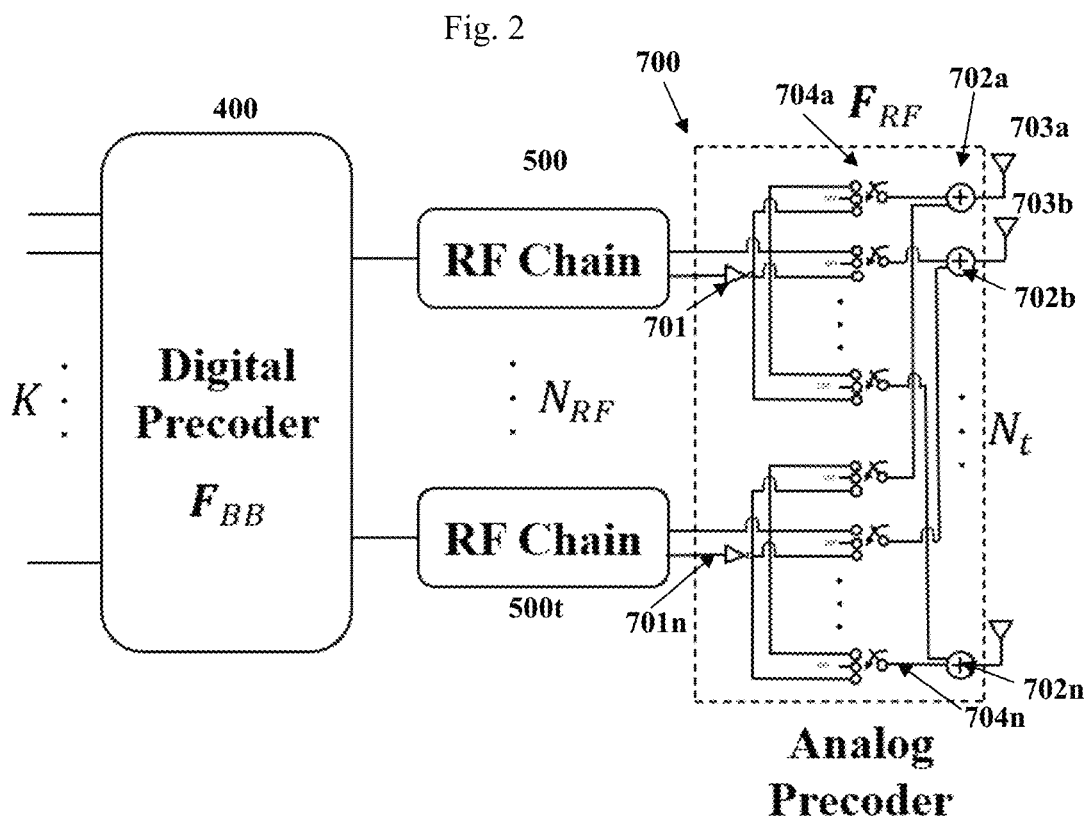
FIG. 3 illustrates the required hardware architecture of the hybrid precoder proposed by the present invention. The represented architecture is fully connected and uses three-way switches and inverters according to the embodiments of the present invention.

To solve this problem, the present invention considers the hybrid precoder architecture illustrated in FIG. 3. The illustrated apparatus considers low-cost and energy-efficient analogic components for performing MU-MIMO communication. Note that the considered hybrid precoder architecture uses three-way switches rather than PSs, which decreases the manufacturing cost and power consumption.

The considered hybrid precoder comprises a digital precoder 400 for processing the baseband signals, a plurality of RF chains 500-500t for processing the baseband signals, and an analog precoder 700 for processing the analog signals or passband signals. The architecture of the analog precoder 700 comprises a plurality of adders 702a-702n connected to the plurality of antennas 703a-703n, where each antenna of the plurality of antennas 703a-703n is connected to an adder of the plurality of adders 702a-702n. Each RF chain of the plurality of RF chains 500-500t is connected to one thee-way switch, which is connected to the plurality of adders 702a-702n.

In the present invention, the analog precoder 700 makes use of the three-way switches 704a-704n to select one analog operation for each analog signal or passband signal. There are three possible analog operations; the first one consists of not modifying the signal. It is given by the first terminal of the three-way switches, which is directedly connected to the respective RF chain. The second analog operation is to invert the phase of the analog signal and is given by the second terminal of the three-way switches, which is connected to an inverter 701. The third terminal of the three-way switches offers the third analog operation that turns off the signal.

Therefore, the three-way switches offer three possible options for the passband signals, i.e., to invert the phase, to not invert the phase, and to turn off the signal. This arrangement provides more freedom degrees than one-bit PSs but less than two-bits PSs. Even so, the numerical results show that the proposed invention overcomes the considered hybrid precoder with one, two, and even three-bits PSs.

The advantages of the proposed architecture will be discussed in terms of the achieved energy efficiency.

Power Consumption of the Considered Hybrid Precoding Architectures

TABLE 1

Power consumption of the main elements for precoding.

| Description | Notation | Considered value |
|---|---|---|
| Digital baseband precoder | $P_{BB}$ | $P_{BB}$ = 200 mW |
| RF chain | $P_{RF}$ | $P_{RF}$ = 300 mW |
| Infinite-resolution PS | $P_{PS}$ | $P_{PS}$ = 40 mW |
| Finite-resolution PS | $P_{PS}$ | $P_{PS}$ = 10 $N_b$ mW |
| Signal adder | $P_A$ | $P_A$ = 5 mW |
| Inverter | $P_{IN}$ | $P_{IN}$ = 5 mW |

Let us consider the power consumption of the elements described in Table 1, whose values have been validated by previous works (see for example document Y. Lu, C. Cheng, J. Yang, and G. Gui, "Improved hybrid precoding scheme for mmWave large-scale MIMO systems", IEEE Access, vol. 7, pp. 12027-12034, 2019). Then, the total power consumption of the precoding techniques explained above can be computed as follows:

Fully digital precoder (it represents the conventional technique used for low dimensional MIMO, where there is one dedicated RF chain per antenna element.)

$$P_{FD} = E_T + P_{BB} + N_t P_{RF} \tag{1}$$

Hybrid precoder with fully connected architecture using PSs $$P_{F-PS} = E_T + P_{BB} + N_{RF} P_{RF} + N_{RF} N_t P_{PS} + N_t P_A \tag{2}$$

Hybrid precoder with fully connected architecture using 3SI $$P_{F-3SI} = E_T + P_{BB} + N_{RF} P_{RF} + N_{RF} N_t P_{SW} + N_{RF} P_{IN} + N_t P_A \tag{3}$$

Downlink Transmission

Figure 4:
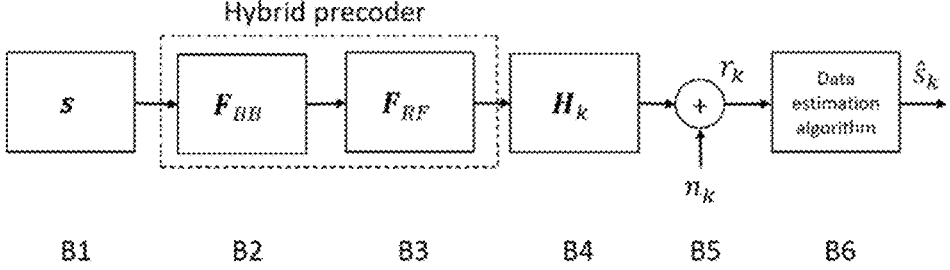
FIG. 4 shows a bock diagram of the downlink transmission for the user k when the proposed hybrid precoder is used in the base station.

FIG. 4 presents a diagram block of the downlink transmission for the user k using hybrid processing in the base station. Block B1 represents the information to be transmitted to all users. The data stream vector s is a concatenation of the users' streams such that $s=[s_1, s_2, \ldots, s_K]^T$, where $s_k \in \mathbb{C}$ represents the data stream symbol of the user k and belongs to a symbols' constellation, e.g., QPSK, 16-QAM, etc.

Blocks B2 and B3 aim to mitigate the undesired effects of the channel and to separate accurately the data stream among the users by reducing the inter-user interference. These two blocks together form the hybrid precoder shown in FIG. 3, where Block B2 refers to the digital precoder 400 and block B3 refers to the analog precoder 700.

Block B2 performs the digital beamforming of the hybrid precoder or baseband beamformer, i.e., the algorithm to be run in the baseband processing through digital components, therefore, changes in amplitude and phase of the signals are available. These changes are specified by the matrix $F_{BB}$, and they can be performed by an integrated circuit capable of manipulating signals, such as an FPGA as considered hereafter for the following description. The entries values of the matrix $F_{BB}$ tells the FPGA how much it must change the signal in both phase and amplitude. Observe that thanks to the hardware reduction, the FPGA must just manipulate $N_{RF}$ signals rather than $N_t$, and in the present invention, the value of $N_{RF}$ is reduced to the number of users K such that $N_{RF}=K$.

Once the signals have been modified by the digital precoder 400, they pass through the RF chains 500-500t as specified in FIG. 3, this process transforms the digital signals into analog signals, amplifies the signals powers, and so on. Then, another precoding process is performed, but only analog changes are available because analog components make them. For the present invention, the possible analog changes are to invert or not the signal phases and to turn off/on the signals. The phase changes are performed typically by PSs; however, the proposed architecture uses low cost and energy-efficient three-way switches and inverters rather than PSs.

The analog precoder 700, which functions as an analog beamformer represented as $F_{RF}$, or by Block B3 in FIG. 4, tells the switches how they must be positioned to obtain an optimal performance.

Once the signals have been modified by the analog precoder part, the signals are propagated using a large number of antennas (see FIG. 3). These propagated signals are attenuated by different multi-paths from the base station to the user k, and such attenuations, $h_1$-$h_k$, are represented as the channel matrix $h_k$ (this matrix in the literature is also known as channel gain matrix) or by Block B4 in FIG. 4.

On the other hand, due to the circuit imperfections in the receiver side an additive white Gaussian noise, $n_k$, is added, such that the received signal by the user k, $r_k \in \mathbb{C}$, is expressed as $$r_k = h_k F_{RF} F_{BB} s + n_k \qquad (4)$$

Denoting $f_k$ as the hybrid precoder part related to the user k, which corresponds to the k-th row of the product $F_{RF}F_{BB}$, equation (4) can be rewritten as $$r_k = h_k f_k s_k + \sum_{j \neq k} h_k f_j s_j + n_k \qquad (5)$$

Equation (5) is composed by three terms, the signal desired by user k, the inter-user interference, and the noise. The analog beamformer $F_{RF}$ and digital beamformer $F_{BB}$ proposed by the present invention produces that received signal the user k can be reduced and written as $$r_k = \gamma_k s_k + n_k \qquad (6)$$

Observe that the present invention eliminates the inter-user interference and mitigates the undesired effects of the channel. Note that only the variable $\gamma_k$ is affecting the desired data signal $s_k$. Therefore, the receiver can perform a very simple algorithm to estimate $s_k$, e.g., the receiver can estimate $\gamma_k$ by reference signals and then performs a data estimation algorithm; or instead of estimating $\gamma_k$ the receiver can have a set of the most probable values of $\gamma_k$ according to its signal-to-noise ratio (SNR) and then run a data estimation algorithm, or just run directly an algorithm for data detection. This data estimation algorithm is represented by Block B6 in FIG. 4. There are many algorithm options for data detection, one of the most popular is by minimum distance detection, which rounds $r_k$ to its closest symbol representation from the used constellation, e.g., QPSK, 64QAM, etc.

Proposed Hybrid Precoding Method

As seen above, given functions and steps necessary for establishing communication, the present invention refers to a method for performing MU-MIMO communication that comprises:

computing a digital beamformer matrix with a digital precoder for processing baseband signals to be transmitted;

processing the signals with a plurality of RF chains;

computing an analog beamformer matrix with an analog precoder for processing the analog or passband signals, wherein the analog precoder comprises:

a plurality of adders connected to the plurality of antennas, wherein each antenna of the plurality of antennas is connected to an adder of the plurality of adders;

a plurality of three-way switches is connected to the plurality of radiofrequency chains and each three-way switch is connected to the plurality of adders, wherein the first terminal of the three-way switches is directedly connected to the respective RF chain, the second terminal of the three-way switches is connected to an inverter for inverting the phase of the signal, and the third terminal of the three-way switches turns off the signal; and the three-way switches are set based on the computed analog beamforming matrix; and computing an optimization function to obtain a maximization of the system sum-rate with basis on the digital and analog beamforming matrixes, wherein the analog precoder sets the position of the three-way switches with the basis on the maximized sum-rate.

Having generally described the considered hardware architecture and the exemplificative diagram of the downlink transmission, the computation of the proposed signal processing for the considered hybrid precoder architecture will be described below.

The proposed algorithm aims to maximize the achievable sum-rate by setting the appropriated switches values positions in the hybrid precoding architecture. For the digital precoder 400, $F_{BB}$, we recommend using the classic Zero Forcing (ZF) precoder as considered in the description of the present invention. However, any other linear precoder can be used, but such selection will incur in some changes of the modeling because it changes Equation (6) and, therefore, the data estimation procedure in the receiver must be adapted accordingly. Following the explanation of the illustrative embodiment, the digital precoder 700 can be formally computed as:

$$F_{BB} = c_n (H F_{RF})^\dagger \qquad (7)$$

where $$H = \begin{bmatrix} h_1^T & \dots & h_K^T \end{bmatrix}^T$$

and $c_n$ is computed to satisfy the power constraint such that $$\|F\|_F^2 = \|F_{RF} F_{BB}\|_F^2 = E_T,$$

where $E_T$ represents the total available power for transmission.

In the proposed hybrid precoding architecture illustrated in FIG. 3, there are $N_t N_{RF}$ switches with 3 possible values, such that the total number of switching combinations is $3^{N_t N_{RF}}$. Exploring such quantity of options by brute force is prohibitive, so a more proper switching method is required. The three options of the switches, to invert, not to invert, and to turn off, can be represented by the components of the set $\mathcal{F} = \{-1, 1, 0\}$, respectively. Thus, the proposed optimization problem can be defined as:

$$F_{RF}^* = \underset{F_{RF} \in \mathcal{F}^{N_t \times N_{RF}}}{\operatorname{argmax}} R \qquad (8)$$

where R represents the sum-rate of the system. The steps of the proposed solution for this optimization problem are described below.

Let $f \in \mathcal{F}^{N_t N_{RF} \times 1}$ be the vectorized version of the matrix $F_{RF}$.

$$f = \begin{bmatrix} (F_{RF})_{:,1}^T, (F_{RF})_{:,2}^T, \dots, (F_{RF})_{:,N_{RF}}^T \end{bmatrix}^T \qquad (9)$$

where $(F_{RF})_{:,j}$ denotes the j-th column of the $F_{RF}$.

Step 1. Map the decimal value of the j-th entry of f, $f_j$, to its binary representation $B_{j,:} \in \mathcal{B}^{1 \times 2}$ using Table 2, for j=1, . . . , $N_t N_{RF}$, where $\mathcal{B} = \{0,1\}$. Thus, the vector $f \in$ $\mathcal{F}^{N_t N_{RF} \times 1}$ can be written as a binary matrix $B \in \mathcal{B}^{N_t N_{RF} \times 2}$. Note that $B_{j,:}$ represents the j-th row of the matrix B. Then, the binary matrix B is vectorized by stacking its columns as follows:

$$g = [B_{:,1}^T B_{:,2}^T]^T \tag{6}$$

TABLE 2

Mapping table

| Binary representation | Decimal Representation | Description |
|---|---|---|
| (0, 0) | 0 | Turn off |
| (0, 1) | 1 | Not invert the phase |
| (1, 1) | −1 | Invert the phase |
| (1, 0) | | Uniform random selection from $\mathcal{F}$ |

Step 2. Consider $p_j$ as the probability of $g_j=1$, and $1-p_j$ as the probability of $g_j=0$, where $g_j$ is the j-th entry of the vector g, $j=1, 2, \ldots, M$, and $M=2N_t N_{RF}$. Thus, the probability of the M switches values represented by the binary vector g is given by $$p=[p_1, p_2, \ldots, p_M]^T \tag{7}$$

Since there is no priori information, the probability is initialized to $p^{(0)}=(\frac{1}{2})1_{M \times 1}$, where $1_{a \times b}$ is a ones matrix with size a×b. Note that although there are four binary representations, the three options of the three-way switches are equally likely thanks to the operation of (1,0) (see Table 2).

Step 3. Generate S random vectors $g^s$, $s=1, 2, \ldots, S$, according to $p^{(m)}$, where m represents the m-th iteration.

Step 4. Obtain the decimal representation $f^s$ from $g^s$ for $s=1, 2, \ldots, S$ using Table 2. Then, calculate $$F^s = F_{RF}^s F_{BB}^s$$

by reorganizing $f^s$ and using (7). After that, compute the sum-rate $R(F^s)$ by making use of $$R = \sum_{k=1}^{K} \log_2 \left(1 + \frac{\|h_k F_{:,k}\|^2}{\sum_{j \neq k}^{K} \|h_k F_{:,j}\|^2 + \sigma_n^2}\right) \tag{8}$$

Step 5. Select the $S_{elite}$ largest sum-rate values from Step 5, $R(F^1)>R(F^2)> \ldots >R(F^{S_{elite}})$.

Step 6. Compute the weights of the $S_{elite}$ candidates $$w_s = \frac{S_{elite}|R(F^S) - R(F^{S_{elite}})|}{\sum_{s=1}^{S_{elite}}|R(F^S) - R(F^{S_{elite}})|} \tag{13}$$

Step 7. Update $p^{(m+1)}$ $$p_j^{(m+1)} = \frac{\sum_{s=1}^{S_{slite}} w_s g_j}{\sum_{s=1}^{S_{slite}} w_s} \tag{9}$$

Return to Step 3 and increase the iteration counter m=m+1 to repeat this procedure up to reach the maximum number of iterations, $N_i$. Then, $F^*_{RF}$ is taken from the best sum-rate value among all iterations.

It should be noted that the proposed method for performing MU-MIMO communication is based on the architecture of the hardware used for the analog precoder 700 but also on the processing for setting the apparatus, which is executed by both the digital and analog beamformers.

The example embodiments described herein may be implemented using hardware, software, or any combination thereof and may be implemented in one or more computer systems or other processing systems. Additionally, one or more of the steps described in the example embodiments herein may be implemented, at least in part, by machines. Examples of machines that may be useful for performing the operations of the example embodiments herein include general-purpose digital computers, specially programmed computers, desktop computers, server computers, client computers, portable computers, mobile communication devices, tablets, and or similar devices.

For instance, one illustrative system for performing the operations of the embodiments herein may include one or more of the following components: microprocessors for performing the arithmetic and or logical operations required for program execution; storage media such as disk drives, memory cards, or flash memory, for program and data storage; and a random access memory for temporary data and program instruction storage.

Therefore, the present is related to a system for performing MU-MIMO communication, characterized by comprising a processor and a memory storing the computer-readable instructions, whose execution causes the processor to perform the method steps previously described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android, and the like, and can adhere to various protocols such as the Ethernet, ATM, TCP/IP protocols, and or other connection or connectionless protocols.

As is well known in the art, microprocessors can run different operating systems and contain several types of software dedicated to a specific function, such as handling and managing data/information from a particular source or transforming data/information from one format into another. The embodiments described herein are not to be construed as being limited to the use of any particular type of computer server, but any other suitable type of device for facilitating the exchange and storage of information may be employed instead.

Software embodiments of the illustrative embodiments presented herein may be provided as a computer program product or software, whose instructions may be included in a manufactured article as machine-accessible or non-transitory computer-readable medium, a.k.a., "machine-readable medium." The instructions on the machine-accessible or machine-readable medium may be used to program a computer system or other electronic device. The machine-readable medium may include, but is not limited to, floppy diskettes, optical disks, CD-ROMs, magneto-optical disks, or another type of media/machine-readable medium suitable for storing or transmitting electronic instructions.

Therefore, the present invention also relates to a non-transitory computer readable storage medium for performing multiple user multiple input multiple output (MU-MIMO) communication, comprising computer readable instructions that, when performed by the processor, causes the processor to perform the method steps previously described in this disclosure.

The techniques described herein are not limited to any particular software configuration. They may be applicable in any computing or processing environment. The terms "machine-accessible medium," "machine-readable medium," and "computer-readable medium" used herein shall include any non-transitory medium capable of storing, encoding, or transmitting a sequence of instructions for execution by the machine (e.g., a CPU or other processing device type) and that cause the machine to perform any one of the methods described herein. Furthermore, it is common in the art to speak of software, in one form or another (e.g., program, procedure, process, application, module, unit, logic, and so on) as triggering, performing, or causing a result. Such expressions are merely a shorthand way of stating that the software executed by a processing system causes the processor to act to produce a result.

<center>EFFECT</center>

In the simulations, the channels are generated by considering that the antenna array 101 of the base station 100 is arranged as a uniform planar array with square format. The total energy available at the base station 100, $E_T$, is equal to K. The results are averaged over $10^3$ channel realizations. The parameters of the proposed algorithm are: S=500, $S_{elite}$=40, and $N_i$=60. For comparison purposes, we consider the PS-based hybrid processing proposed in Ortega, A. J. (2021). Hierarchical optimization: A hybrid processing for downlink massive MU-MIMO mmWave systems. *IET Communications,* 15(20), 2526-2536, which is referred hereafter as PS-HB and also simulated with different PS's bits resolution.

Figure 5:
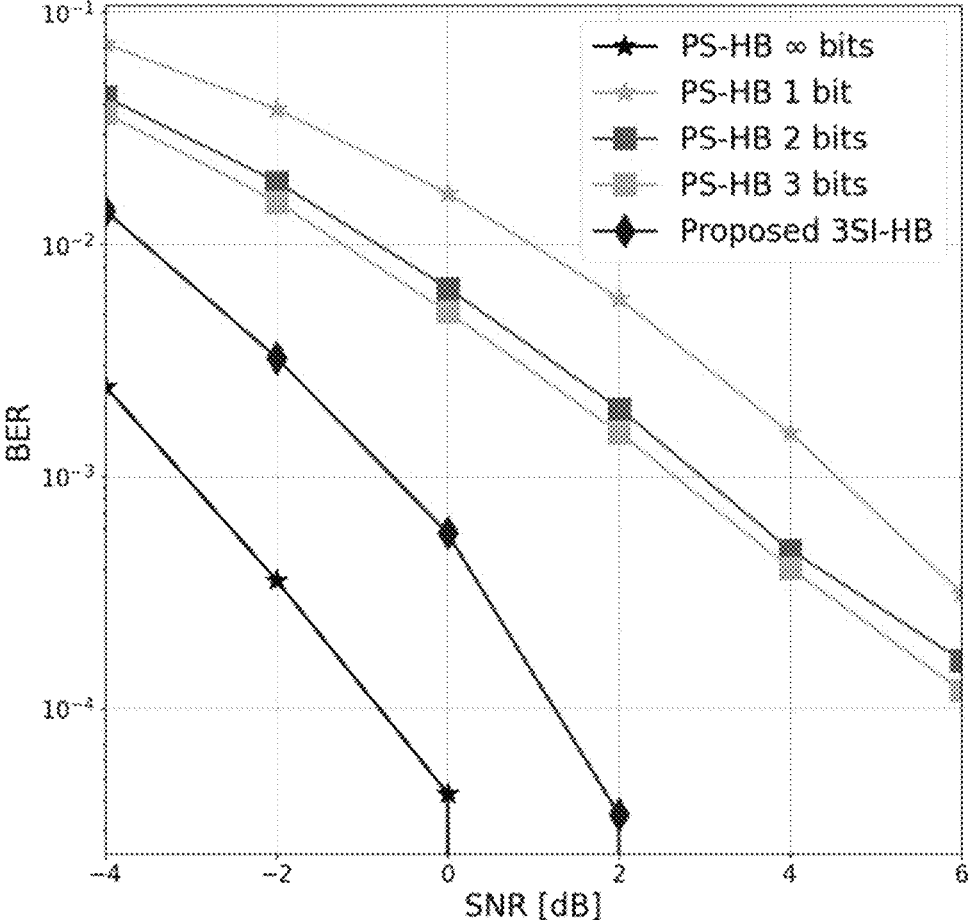
FIG. 5 shows the simulation results in terms of the bit error rate (BER) for a particular scenario.
Figure 6:
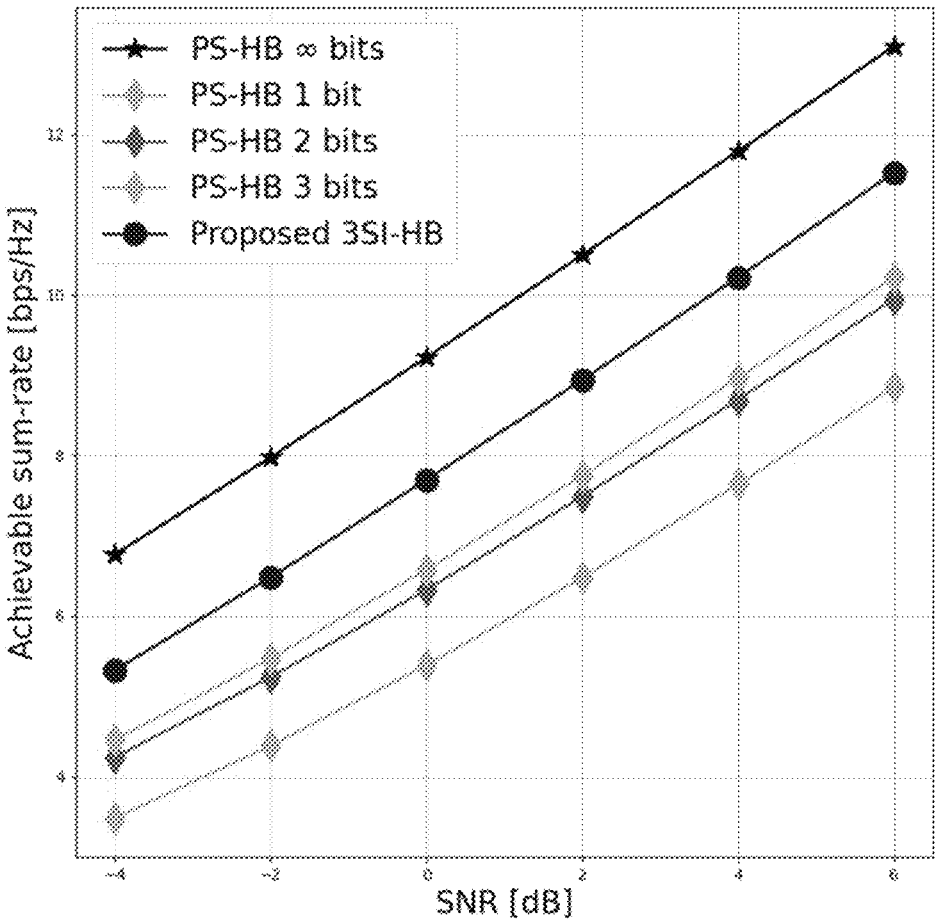
FIG. 6 shows the simulation results in terms of the sum rate for a particular scenario.

FIGS. 5 and 6 present the BER and achievable sum-rate results, respectively, that are obtained by considering a mmWave large-scale scenario where the BS is equipped with $N_t$=64 antennas that is transmitting to 2 single-antenna users.

In FIG. 5, it is observed that PS-HB with infinity resolution PSs (i.e., PS-HB ∞, the lowest black curve with stars) reaches the best BER performance. However, PS with infinity resolution are not viable. Note that using the strategy of PS-HB with more accessible low-resolution PSs, its performance is greatly reduced. In contrast, the present invention obtains the second-best BER performance, reaching a gain of 3 dB over PS-HB with 3 bits (i.e., PS-HB 3 bits, green curve with squares), which has more analog processing freedom degrees. In a similar manner, it happens when we consider the achievable sum-rate as evidenced in FIG. 6.

Figure 7:
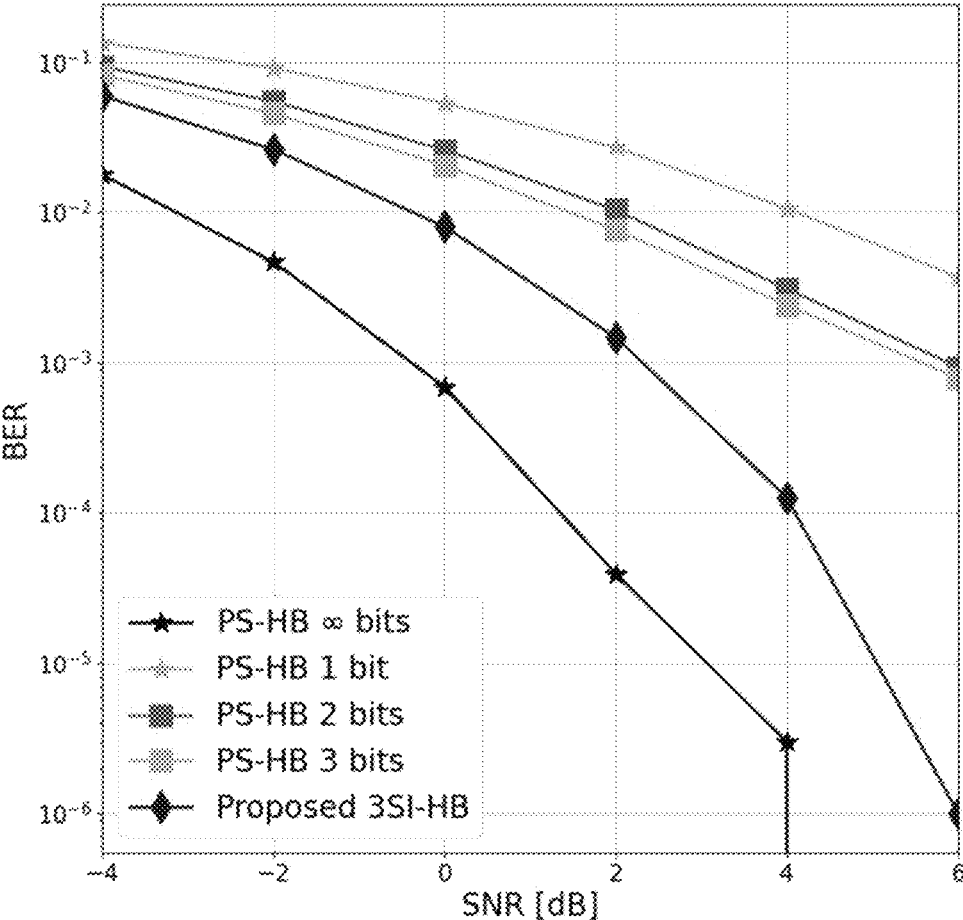
FIG. 7 shows the simulation results in terms of the BER for another scenario.
Figure 8:
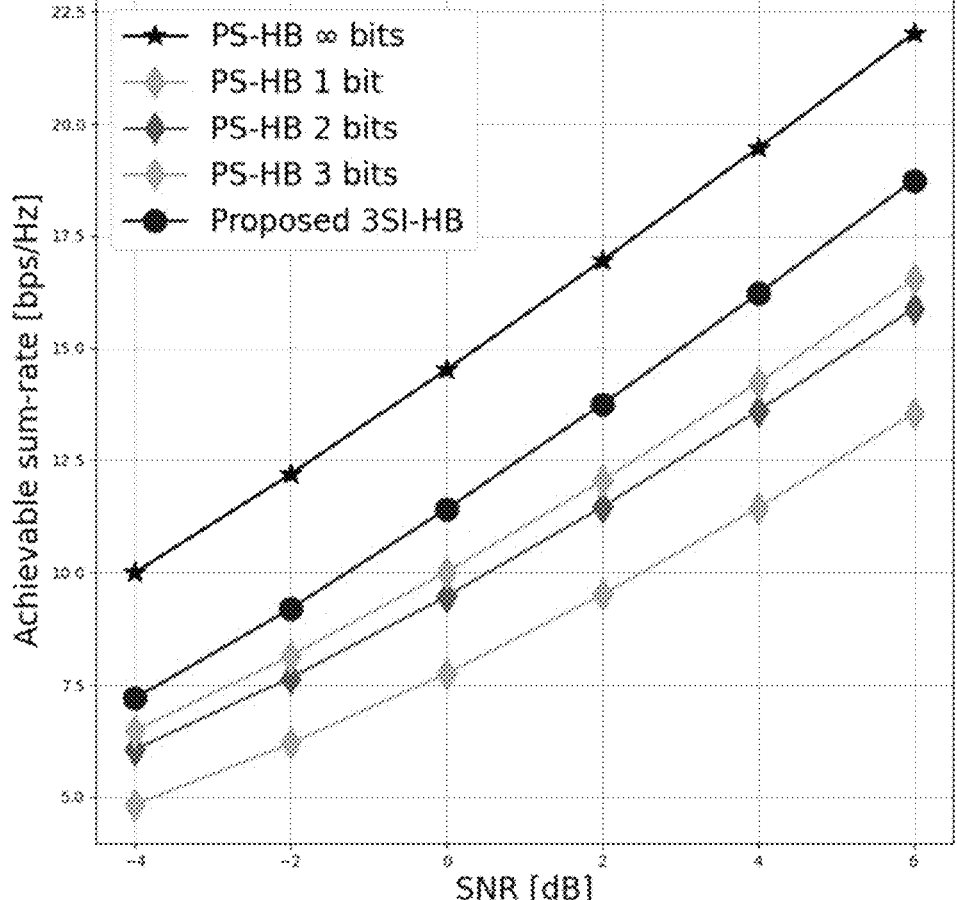
FIG. 8 shows the simulation results in terms of the sum rate for another scenario.

FIGS. 7 and 8 show the BER and achievable sum-rate results, respectively, considering a mmWave large-scale scenario where the BS is equipped with $N_t$=64 antennas and there are 4 single-antenna users. FIGS. 7 and 8 evidence that the hierarchy of the considered signal processing techniques in the previous scenario is hold. The proposed method gets to optimize the analog processing for hybrid processing in a such manner that only three analog signal operations can reach better results than eight signal phase changes, or in other words, that 3SI is more effective than PSs with 3 bits.

Figure 9:
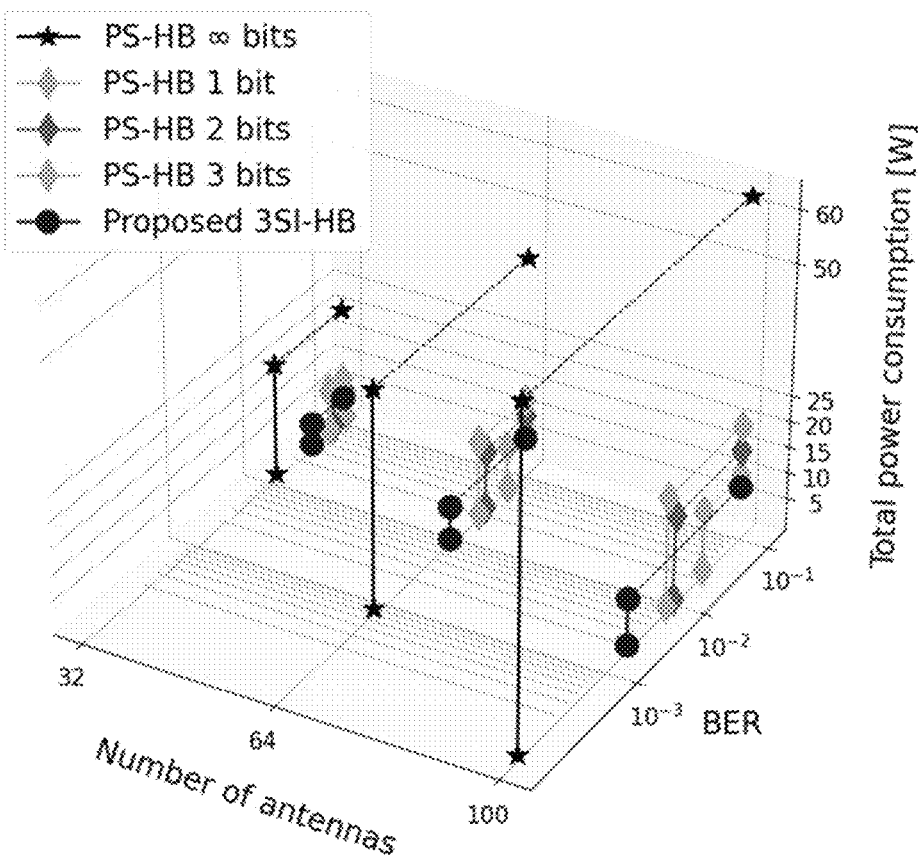
FIG. 9 shows the positive effects on the BER and power consumption obtained by the present invention using different numbers of antennas.
Figure 10:
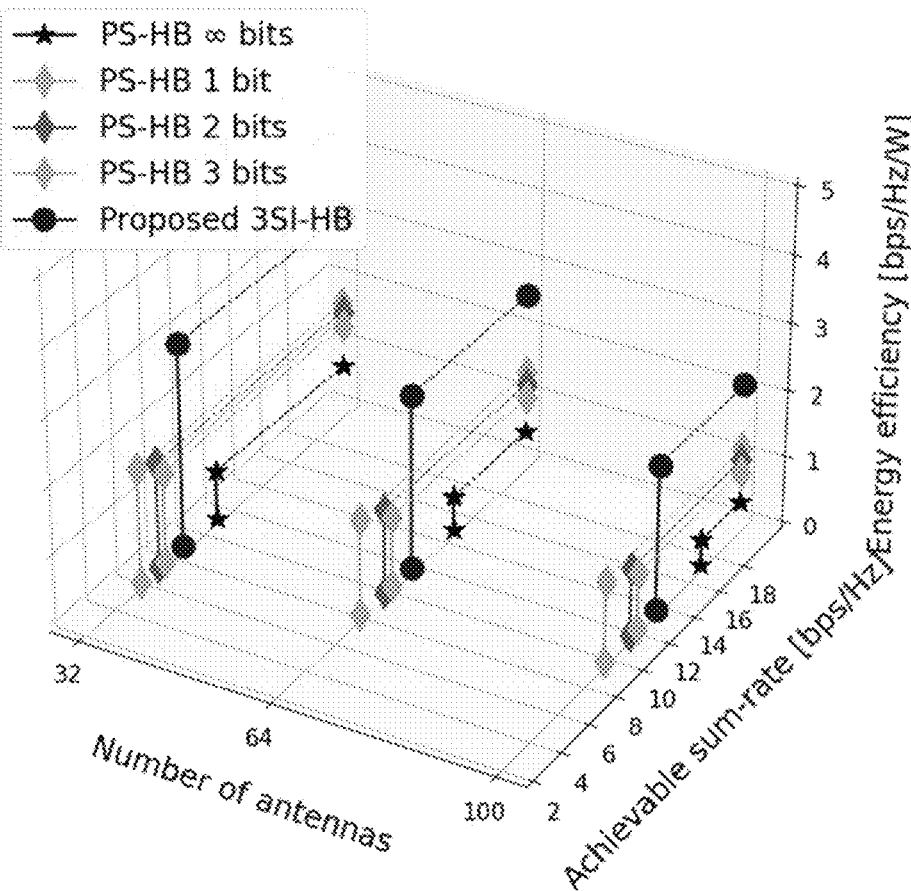
FIG. 10 presents the positive effects of the present invention in terms of energy efficiency and sum rate for different numbers of antennas.

An important advantage of the present invention relies on its low power consumption and high energy efficiency, which can be analyzed through FIGS. 9 and 10. The simulated scenarios consider the following fixed parameters K=4 and SNR=0 dB. In FIG. 9, it is observed that PS-HB with infinity-resolution PSs greatly increases the system performance as the number of antennas is larger. However, it is hungry power, doubling, or even tripling the power consumption of the other considered techniques. On the other hand, observe that the present invention reaches an excellent BER performance and the lowest total power consumption in all tested scenarios. This fact highlights the high energy-efficiency potentials of the present invention that are evidenced in FIG. 10 as well. Note that although, PS-HB with infinite-resolution PSs obtains the largest achievable sum-rate values, its energy efficiency is poor. In conclusion, the proposed method follows PS-HB with infinity resolution, PS-HB ∞, but reaching the highest energy efficiency.

Therefore, as seen above the present invention proposes a method to set the optimal values of the three-way switches of the considered hybrid precoder architecture. Therefore, the present invention provides a solution to use a low-cost and energy-efficient hardware architecture in the MIMO transmitters, obtaining an optimal performance and reliable communication. Furthermore, the present invention provides a signal processing procedure that together with the considered hardware architecture can make that the next wireless devices use massive MIMO.

While various example embodiments have been described above, it should be understood that they have been presented by way of example, and not limitation. It will be apparent to persons skilled in the relevant art(s) that various changes in form and detail can be made therein. For example, the present invention can be used to substitute the HDMI wire connection with an HDMI wireless connection.

What is claimed is:

1. A method for performing multiple user multiple input multiple output (MU-MIMO) communication, the method comprises:

computing a digital beamformer matrix with a digital precoder for processing baseband signals to be transmitted;

processing the baseband signals with a plurality of radiofrequency (RF) chains;

computing an analog beamformer matrix with an analog precoder for processing analog or passband signals, wherein the analog precoder comprises:

a plurality of adders that are connected to a plurality of antennas, wherein each antenna of the plurality of antennas is connected to an adder of the plurality of adders;

a plurality of three-way switches is connected to a plurality of RF chains and each three-way switch of the plurality of three-way switches is connected to the plurality of adders, a first terminal of the plurality of three-way switches is directly connected to a respective RF chain among the plurality of RF chains, a second terminal of the plurality of three-way switches is connected to an inverter for inverting a phase of the analog or passband signal, and a third terminal of the plurality of three-way switches turns off the analog or passband signal, and the plurality of three-way switches is set based on the computed analog beamforming matrix; and computing an optimization function to obtain a maximization of a system sum-rate based on the digital beamformer matrix and the analog beamforming matrix, wherein the analog precoder sets a position of the plurality of three-way switches based on the maximized sum-rate.

2. The method according to claim 1, further comprising: computing, with the digital precoder, at least one of a linear precoder and a Zero Forcing (ZF) linear precoder and the digital beamforming matrix to be computed is determined by:

$$F_{BB}=c_n(HF_{RF})^\dagger,$$

where $$H = \begin{bmatrix} h_1^T & \dots & h_K^T \end{bmatrix}^T, h_k$$

is a channel matrix between a base station or a transmitter and the user k or receiver k, and $c_n$ is determined to satisfy the power constraint $$\|F\|_F^2 = \|F_{RF}F_{BB}\|_F^2 = E_T,$$

where $E_T$ represents the total available power for transmission.

3. The method according to claim 1, wherein the analog precoder comprises $N_tN_{RF}$ three-way switches having three possible values, three options of the plurality of three-way switches, to invert, not to invert, and to turn off, represented by the components of the set $\mathcal{F} =\{-1,1,0\}$, respectively, and the proposed optimization function is determined by:

$$F_{RF}^* = \underset{F_{RF}\in\mathcal{F}^{N_t\times N_{RF}}}{\mathrm{argmax}}\ R$$

where R represents the sum-rate of the system, $N_t$ and $N_{RF}$ are a number of antennas and a number of RF chains in a base station or a transmitter, respectively; $F^*_{RF}$ is an optimum analog beamformer, $$f = \begin{bmatrix} (F_{RF})_{:,1}^T, (F_{RF})_{:,2}^T, \dots, (F_{RF})_{:,N_{RF}}^T \end{bmatrix}^T, f \in \mathcal{F}^{N_tN_{RF}\times 1}$$

be the vectorized version of the matrix $F_{RF}$ and $(F_{RF})_{:,j}$ is the j-th column of the $F_{RF}$; and
the method maps the decimal value of the j-th entry of f, $f_j$, to its binary representation $B_{j,:}\in \mathcal{B}^{1\times 2}$ according to:

| Binary representation | Decimal Representation | Description |
|---|---|---|
| (0, 0) | 0 | Turn off |
| (0, 1) | 1 | Not invert the phase |
| (1, 1) | −1 | Invert the phase |
| (1, 0) | | Uniform random selection from $\mathcal{F}$ | where $B\in \mathcal{B}^{N_tN_{RF}\times 2}$, $\mathcal{B} =\{0,1\}$, $B_{j,:}$ is the j-th row of the matrix B, then, the obtained binary matrix B is vectorized by stacking its columns as follows:

$$g = \begin{bmatrix} B_{:,1}^T B_{:,2}^T \end{bmatrix}^T.$$

4. The method according to claim 3 comprises even more: computing a probability of the N switches values, p=[p1, p2, . . . , pm]$^T$, for the binary vector g, where $g_j$ is the j-th entry of the vector g, and j=1, 2, . . . , M, and M=2$N_t$+$N_{RF}$, the probability of $g_j$=1, is given by $p_j$, and the probability of $g_j$=0 is given by 1−pj, since, there is no priori information, the probability is initialized to $p^{(0)}=(\frac{1}{2})1_{M\times 1}$, where $1_{a\times b}$ is a ones matrix with size a×b.

5. The method according to claim 3 further comprises generating S random vectors $\bar{g}^s$, s=1, 2, . . . , S, according to the probability of the switch values for each iteration, $p^{(m)}$, where m represents the m-th iteration.

6. The method according to claim 4, further comprising obtaining the decimal representation $f^s$ from $g^s$ for s=1, 2, . . . , S;
reorganizing $f^s$ to obtain $$F_{RF}^s;$$

and
calculating $$F^s = F_{RF}^s F_{BB}^s, s = 1, \dots, S;$$

and computing the achievable sum-rate $R(F^s)$ using:

$$R = \sum_{k=1}^{K} \log_2\left(1 + \frac{\|h_kF_{:,k}\|^2}{\sum_{j\neq k}^{K}\|h_kF_{:,j}\|^2 + \sigma_n^2}\right).$$

7. The method according to claim 6, further comprising selecting the $S_{elite}$ largest sum-rate values, such that $R(F^1)>R(F^2)> \dots >R(F^{S_{elite}})$; and compute the weights of the $S_{elite}$ candidates using:

$$w_s = \frac{S_{elite}|R(F^S) - R(F^{S_{elite}})|}{\sum_{s=1}^{S_{elite}}|R(F^S) - R(F^{S_{elite}})|}.$$

8. The method according to claim 7, wherein the probabilities related to the $N_{RF}N_t$ switches are updated by:

$$p_j^{(m+1)} = \frac{\sum_{s=1}^{S_{slite}}w_sg_j}{\sum_{s=1}^{S_{slite}}w_s}$$

and the method further comprises:
repeating the process to obtain the decimal representation $f^s$, reorganize $f^s$ and calculate $F^s$; increasing the iteration counter m=m+1 until reaching an established number of iterations; and
determining the optimum analog beamformer, $F^*_{RF}$, by the best sum-rate value among all iterations.

9. A system for performing multiple user multiple input multiple output (MU-MIMO) communication, comprising a processor, and a memory, storing computer readable instructions that, when performed by the processor, it causes the processor to perform the method according with claim 1.

10. A non-transitory computer readable storage medium, storing computer readable instructions that, when executed by a processor, causes the processor to perform the method of claim 1.

\* \* \* \* \*